(12) United States Patent
Li

(10) Patent No.: US 11,556,419 B2
(45) Date of Patent: Jan. 17, 2023

(54) METHOD AND SYSTEM OF DEDUPLICATION OF ERROR CODEC IN HYPERSCALE INFRASTRUCTURE

(71) Applicant: ALIBABA GROUP HOLDING LIMITED, Grand Cayman (KY)

(72) Inventor: Shu Li, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 20 days.

(21) Appl. No.: 17/124,845

(22) Filed: Dec. 17, 2020

(65) Prior Publication Data

US 2022/0197743 A1    Jun. 23, 2022

(51) Int. Cl.
*G06F 11/10* (2006.01)
*G06F 11/30* (2006.01)
*G06F 3/06* (2006.01)

(52) U.S. Cl.
CPC .......... *G06F 11/1076* (2013.01); *G06F 3/067* (2013.01); *G06F 3/0619* (2013.01); *G06F 3/0659* (2013.01); *G06F 3/0683* (2013.01); *G06F 11/1004* (2013.01); *G06F 11/3034* (2013.01)

(58) Field of Classification Search
CPC ............. G06F 11/1076; G06F 11/1004; G06F 11/3034; G06F 3/0619; G06F 3/0659
See application file for complete search history.

(56) References Cited

U.S. PATENT DOCUMENTS

| 8,359,521 B2 * | 1/2013 | Kim ................... G06F 11/1004 |
| | | 714/766 |
| 9,836,245 B2 * | 12/2017 | Hayes ................... G06F 11/108 |
| 10,061,668 B1 * | 8/2018 | Lazier ................ G06F 11/1076 |

* cited by examiner

*Primary Examiner* — Nadeem Iqbal
(74) *Attorney, Agent, or Firm* — Finnegan, Henderson, Farabow, Garrett & Dunner, LLP

(57) ABSTRACT

The present disclosure provides methods, systems, and non-transitory computer readable media for performing data transfers with improved error encoding. The methods include receiving a request for data transfer from a source medium in the data storage system to a destination medium in the data storage system, wherein the data storage system comprises a computer cluster and a storage cluster; determining whether the source medium and the destination medium are within the storage cluster; based on the determination of whether the source medium and the destination medium are within the storage cluster, transferring the data from the source medium to the destination medium, wherein: the data is transferred without performing error correcting code check when the data is transferred within the storage cluster, and the data is transferred with an error correcting code check when the data is transferred between the computer cluster and the storage cluster.

20 Claims, 9 Drawing Sheets

US 11,556,419 B2

METHOD AND SYSTEM OF DEDUPLICATION OF ERROR CODEC IN HYPERSCALE INFRASTRUCTURE

TECHNICAL FIELD

The present disclosure generally relates to data storage, and more particularly, to methods, systems, and non-transitory computer readable media operating a data storage system.

BACKGROUND

Datacenters are an increasingly vital component of modern-day computer systems of all form factors as more and more applications and resources become cloud based. Datacenters provide numerous benefits by collocating large amounts of processing power and storage. Datacenters can include computer clusters providing computing powers, and storage clusters providing storage capacity. As the amount of data stored in storage clusters increases, it becomes expensive to maintain both storage capacity and storage performance. Moreover, the compute storage disaggregation moves the data away from the processor and increases the cost of moving the tremendous amount of data among different entities from the computer clusters and the storage clusters. To enhance the overall distributed system performance for data transferring in a unit time becomes more and more crucial.

SUMMARY OF THE DISCLOSURE

The present disclosure provides methods, systems, and non-transitory computer readable media for operating a data storage system. An exemplary method includes receiving a request for data transfer from a source medium in the data storage system to a destination medium in the data storage system, wherein the data storage system comprises a computer cluster and a storage cluster; determining whether the source medium and the destination medium are within the storage cluster; based on the determination of whether the source medium and the destination medium are within the storage cluster, transferring the data from the source medium to the destination medium, wherein: the data is transferred without performing error correcting code check when the data is transferred within the storage cluster, and the data is transferred with an error correcting code check when the data is transferred between the computer cluster and the storage cluster.

Embodiments of the present disclosure further provide a non-transitory computer readable medium that stores a set of instructions that is executable by at least one processor of a data storage system to cause the data storage system to perform a method for transferring data, the method comprising: receiving a request for data transfer from a source medium in the data storage system to a destination medium in the data storage system, wherein the data storage system comprises a computer cluster and a storage cluster; determining whether the source medium and the destination medium are within the storage cluster; in response a determination that the source medium and the destination medium are within the storage cluster: transferring the data including error correcting code from the source medium to the destination medium, the error correcting code being encoded when the data is transferred from the computer cluster to the storage cluster, and validating the data transfer with a cyclic redundancy check.

Embodiments of the present disclosure further provide a system, comprising: a computer cluster; a storage cluster; one or more memories storing a set of instructions; and one or more processors configured to execute the set of instructions to cause the system to perform: receiving a request for data transfer from a source medium in the data storage system to a destination medium in the data storage system; determining whether the source medium and the destination medium are within the storage cluster; in response to a determination that the source medium and the destination medium are within the storage cluster: transferring the data including error correcting code from the source medium to the destination medium, the error correcting code being encoded when the data is transferred from the computer cluster to the storage cluster, and validating the data transfer with a cyclic redundancy check.

DETAILED DESCRIPTION

Figure 1:
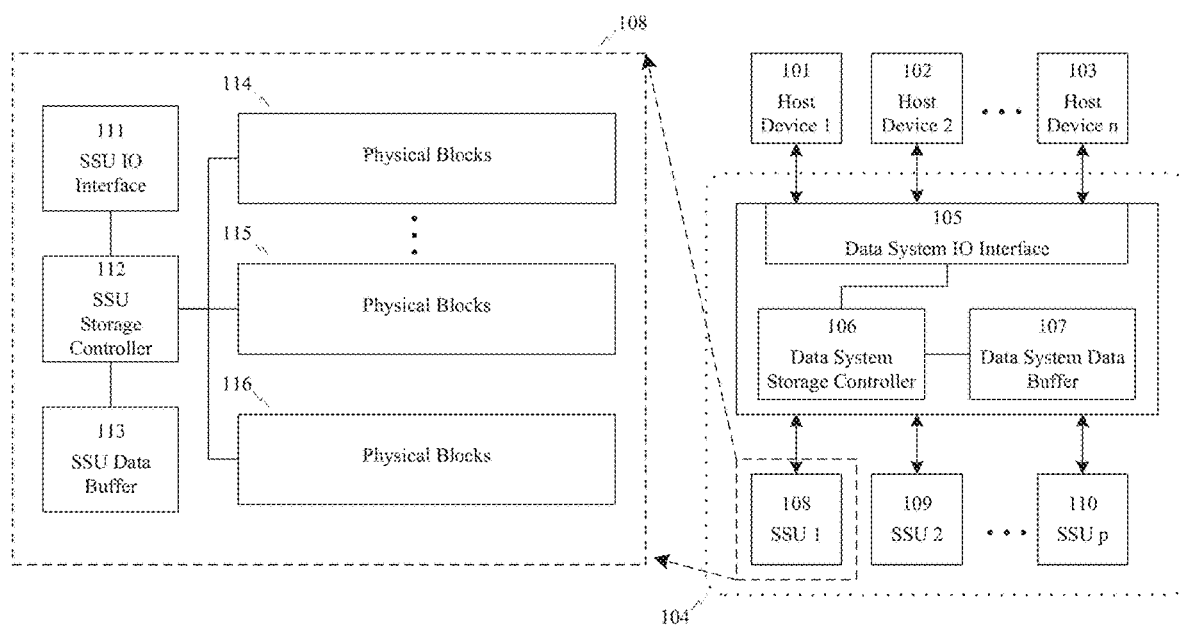
FIG. 1 is a schematic illustrating an example data storage system.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck. Thus, high speed and low latency are factors in choosing an appropriate technology to use in the primary storage unit.

Because of their importance, the technology used for a primary storage unit typically prioritizes high speed and low latency, such as the DRAM typically used in modern day systems that can transfer data at dozens of GB/s with latency of only a few nanoseconds. However, because primary storage prioritizes speed and latency, a tradeoff is that primary storage is usually volatile, meaning it does not store data permanently (e.g., primary storage loses data when the power is lost). Primary storage also usually has two other principle drawbacks: it usually has a low ratio of data per unit size and a high ratio price per unit of data.

Thus, in addition to having a processing unit and a primary storage unit, modern-day computers also have a secondary storage unit. The purpose of a secondary storage unit is to store a significant amount of data permanently. As such, secondary storage units prioritize high capacity—being able to store significant amounts of data—and non-volatility—able to retain data long-term. As a tradeoff, however, secondary storage units tend to be slower than primary storage units. Additionally, the storage capacity of secondary storage unit, like the metrics of many other electronic components, tends to double every two years, following a pattern of exponential growth.

However, even though secondary storage units prioritize storage capacity and even though the storage capacity of secondary storage units tends to double every two years, the amount of data needing storage has begun to outstrip the ability of individual secondary storage units to handle. In other words, the amount of data being produced (and needing to be stored) has increased faster than the storage capacity of secondary storage units. The phenomenon of the quickly increasing amount of data being produced is frequently referred to as "big data," which has been referred to as a "data explosion." The cause of this large increase in the amount of data being produced is largely from large increases in the number of electronic devices collecting and creating data. In particular, a large amount of small electronic devices—such as embedded sensors and wearables—and a large number of electronic devices embedded in previously "dumb" objects—such as Internet of Things (IoT) devices—now collect a vast amount of data. The large amount of data collected by these small electronic devices can be useful for a variety of applications, such as machine learning, and such datasets tend to be more beneficial as the amount of data the datasets contain increases. The usefulness of large datasets, and the increase in usefulness as the datasets grow larger, has led to a drive to create and collect increasingly large datasets. This, in turn, has led to a need for using numerous secondary storage units in concert to store, access, and manipulate the huge amount of data being created, since individual secondary storage units do not have the requisite storage capacity.

In general, there are two ways secondary storage units can be used in parallel to store a collection of data. The first and simplest method is to connect multiple secondary storage units to host device. In this first method, the host device manages the task of coordinating and distributing data across the multiple secondary storage units. In other words, the host device handles any additional complications necessary to coordinate data stored across several secondary storage units. Typically, the amount of computation or resources needed to be expended to coordinate among multiple secondary storage units increases as the number of secondary storage units being used increases. Consequently, as the number of attached secondary storage units increases, a system devotes an increasing amount of its resources to manage the attached secondary storage units. Thus, while having the host device manage coordination among the secondary storage units is usually adequate when the number of secondary storage units is few, greater amounts of secondary storage units cause a system's performance to substantially degrade.

Thus, large-scale computer systems that need to store larger amounts of data typically use the second method of using multiple secondary storage units in parallel. The second method uses dedicated, standalone electronic systems, known as data storage systems, to coordinate and distribute data across multiple secondary storage units. Typically, a data storage system possesses an embedded system, known as the data storage controller (e.g., one or more processor, one or more microprocessors, or even a full-fledged server), that handles the various tasks necessary to manage and utilize numerous attached secondary storage units in concert. Also comprising the data storage system is usually some form of primary memory (e.g., RAM) connected to the data storage controller which, among others uses, is usually used as one or more buffers. The data storage system also comprises one or more attached secondary storage units. The attached secondary storage units are what physically store the data for the data storage system. The data storage controller and secondary storage unit are usually connected to one another via one or more internal buses. The data storage controller is also usually connected to one or more external host devices in some manner, usually through some type of IO interface (e.g., USB, Thunderbolt, InfiniBand, Fibre Channel, SAS, SATA, or PCIe connections), through which the data storage controller receives incoming IO request and sends outgoing IO responses.

In operation, the data storage controller acts as the interface between incoming IO requests and the secondary storage units. The data storage controller acts as an abstraction layer, usually presenting only a single unified drive to attached host devices, abstracting away the need to handle multiple secondary storage units. The data storage controller then transforms the incoming IO requests as necessary to perform any IO operations on the relevant secondary storage units. The data storage controller also performs the reverse operation, transforming any responses from the relevant secondary storage units (such as data retrieved in response to an IO READ request) into an appropriate outgoing IO response from the data storage system. Some of the transformation operations performed by the data storage controller include distributing data to maximize the performance and efficiency of the data storage system, load balancing, encoding and decoding the data, and segmenting and storing the data across the secondary storage units. Data storage systems—through the data storage controller—also are typically used to perform more complex operations across multiple secondary storage units, such as implementing RAID (Redundant Array of Independent Disks) arrays.

FIG. 1 is a schematic illustrating an example data storage system. As shown in FIG. 1, data storage system 104 comprises data system storage controller 106, data system IO interface 105, data system data buffer 107, and several secondary storage units ("SSUs"), shown here as secondary storage units 108, 109, and 110. Data system storage controller 106 receives incoming IO requests from data system IO interface 105, which data system storage controller 106 processes and, in conjunction with data system data buffer 107, writes data to or reads data from secondary storage units 108, 109, and 110 as necessary. The incoming IO requests that data system storage controller 106 receives from data system IO interface 105 come from the host devices connected to data storage system 104 (and which are thus using data storage system 104 to store data). As shown in FIG. 1, in general a data storage system may be connected to multiple host devices, shown here as host devices 101, 102, and 103.

FIG. 1 is a basic schematic illustrating a generalized layout of a secondary storage unit. Using secondary storage unit 108 as an example, FIG. 1 shows how a secondary storage unit comprises an SSU IO interface 111 that receives incoming IO requests and sends outgoing responses. SSU IO interface 111 is connected to SSU storage controller 112, which receives IO request from SSU IO interface 111. In conjunction with SSU data buffer 113, SSU storage controller 112 processes IO requests by reading or writing data from physical blocks, shown here as physical blocks 114, 115, and 116. SSU storage controller 112 may also use SSU TO interface 111 to send responses to IO requests.

While data storage systems can appear even with traditional standalone PCs—such as in the form of external multi-bay enclosures or RAID arrays—by far their most prevalent usage is in large, complex computer systems. Specifically, data storage systems most often appear in datacenters, especially datacenters of cloud service providers (as opposed to datacenters of individual entities, which tend to be smaller). Datacenters typically require massive storage systems, necessitating usage of data storage systems. Typically, a data storage system used by a datacenter is a type of specialized server, known as storage servers or data storage servers. However, typically datacenters, especially the larger ones, have such massive storage requirements that they utilize specialized architecture, in addition to data storage systems, to handle the large volume of data.

Like most computer systems, datacenters utilize computers that are broadly based on the Von Neuman architecture, meaning they have a processing unit, primary storage unit, and secondary storage unit. However, in datacenters, the link between processing unit, primary storage unit, and secondary storage unit is unlike most typical machines. Rather than all three being tightly integrated, datacenters typically organize their servers into specialized groups called computer clusters and storage clusters. Computer clusters comprises nodes called compute nodes, where each compute node can be a server or a host with (typically several) processing units (e.g., CPUs) and (typically large amounts of) primary storage units (e.g., RAM). The processing units and primary storage units of each compute node can be tightly connected with a backplane, and the compute nodes of a computer cluster are also closely coupled with high-bandwidth interconnects, e.g., InfiniBand. However, unlike more typical computer systems, the compute nodes do not usually include much, if any, secondary storage units. Rather, all secondary storage units are held by storage clusters. In some embodiments, different parts in the datacenters can also be grouped as computer domains or storage domains. Computer domains and storage domains are logical concepts that describes different parts of the system. In some embodiments, in the physical storage cluster, there may exist parts belonging to the computer domain. The computer domain can refer to computational parts of the datacenter. The storage domain can refer to parts of the datacenter where the data storing takes place.

Like computer clusters, storage clusters include nodes called storage nodes, where each storage node can be a server with several secondary storage units and a small number of processing units necessary to manage the secondary storage units. Essentially, each storage node is a data storage system. Thus, the secondary storage units and the data storage controller (e.g., the data storage controller's processing units) are tightly connected with a backplane, with storage nodes inside a storage cluster similarly closely connected with high-bandwidth interconnects.

The connection between computer clusters and storage clusters, however, may only be loosely coupled. In this context, being loosely coupled means that the computer clusters and storage clusters are coupled to one another with relatively slower connections. While being loosely coupled may raise latency, the loose coupling enables a much more flexible and dynamic allocation of secondary storage units to processing units. This is beneficial for a variety of reasons, with one reason being that it allows dynamic load balancing of the storage utilization and bandwidth utilization of the various storage nodes. Being loosely coupled can also allow data to be split among multiple storage nodes (like how data within a storage node can be split among multiple secondary storage units), which can also serve to load-balance IO requests and data storage.

Typically, the connection between secondary storage units and processing units can be implemented on the basis of whole storage clusters communicating with whole computer clusters, rather than compute nodes communicating with storage nodes. The connection between storage clusters and computer clusters is accomplished by running all requests of a given cluster (computer or storage) through a load-balancer for the cluster. While routing requests through a load balancer on the basis of clusters raises latency, this arrangement enables large gains in efficiency since each system can better dynamically manage its traffic. In practice, compute time is typically the dominating factor, making memory latency relatively less of an issue. The large amount of RAM available also typically allows preloading needed data, helping to avoid needing to idle a compute node while waiting on data from a storage cluster.

Figure 2:
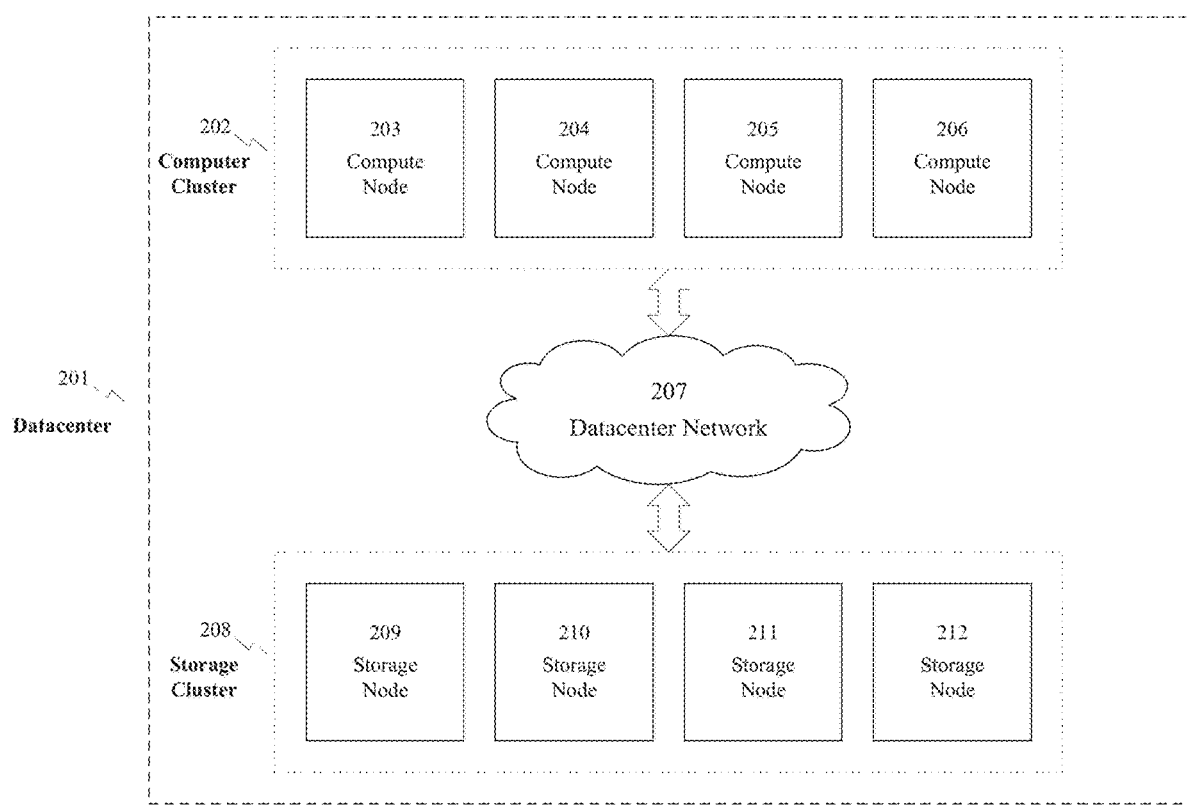
FIG. 2 is a schematic illustrating an example datacenter layout.

FIG. 2 is a schematic illustrating an example datacenter layout. As shown in FIG. 2, datacenter 201 comprises a computer cluster 202 and a storage cluster 208. Computer cluster 202 can include various compute nodes, such as compute nodes 203, 204, 205, and 206. Similarly, storage cluster 208 can include storage nodes, such as storage nodes 209, 210, 211, and 212. Computer cluster 202 and storage cluster 208 can be connected to each other via datacenter network 207. Not shown is the intra-cluster communication channels that couple compute nodes 203, 204, 205, and 206 to each other or the intra cluster communication channels that couple storage nodes 209, 210, 211, and 212 to each other. Note also that, in general, datacenter 201 may be composed of multiple computer clusters and storage clusters.

The compute nodes and the storage nodes (e.g., SSUs 1-p of FIG. 1) can perform error correcting code ("ECC") operations. The ECC operations can control errors in data over communication channels, such as unreliable or noisy communication channels. For example, the compute nodes and the storage nodes can include a set of error correcting code ("ECC") encoder and decoder. When data is stored into secondary storage units, the ECC encodings can be used in flash drives (e.g., NAND flash drives) to detect and correct bit errors that may occur. For example, when data is encoded with ECC, the data can be encoded by adding one or more redundant bits to it. When the original data is reconstructed or retrieved from the secondary storage units, an ECC decoder can examine the encoded message to check for any errors. In some instances, when an error is detected, the error can be corrected as a part of the ECC encoding. For example, when an error is detected, the redundant bits can be used to assist in the generation of the correct data. It is appreciated ECC encodings may correct data without a re-transmission of the data. In some instances, the ECC encodings can further add a parity bit to the data, and the parity bit may be used for error detection.

The secondary storage units (e.g., SSUs 1-p of FIG. 1) can perform cyclic redundancy check ("CRC") operations. The CRC operations can detect accidental changes to raw data. For example, the CRC operations can generate a check value for a block of data according to the contents in the data. When the data is retrieved, the CRC operations can be performed again to generate a new check value on the retrieved data, and the old and the new check values can be compared to determine if the check values match. If the old and the new check values do not match, the original data and the retrieve data may not be the same. In some instances, to mitigate the issue where the old and the new check values do not match, the data can be retrieved again. In some instances, if the check values do not match, corrective action can be taken against data corruption.

Referring back to FIG. 2, computer cluster 202 and storage cluster 208 can include a large number of compute nodes and storage nodes, and the compute nodes and the storage nodes can include hundreds of secondary storage units. As a part of everyday operations in datacenter 201, the data stored in datacenter 201 are not processed, but the data is moved around from one secondary storage unit to another or between compute nodes and storage nodes through various fabrics. For example, compute nodes and storage nodes shown in FIG. 2 can be connected via datacenter network 207, which can include Ethernet connections. Moreover, data can be moved from one secondary storage unit to another through peripheral component interconnect express ("PCIe") or serial attached SCSI ("SAS").

As data is moved around, each data movement can incur a read operation on the source drive and a write operation on the destination drive. In a system that incorporates ECC in the secondary storage units, each read operation may include ECC encoding on the source drive, and each write operation may include ECC decoding on the destination drive. When the amount of data being transferred is large, the complexity of the ECC encoding and decoding also increases, which can result in inefficiency and delays in data transfer. Moreover, in some operations that involve data movements, the source drive could be the same drive as the destination drive. For example, in a garbage collection operation, data from one set of blocks in a drive may be moved to another set of blocks in the same drive. As a result, the large amount of ECC codecs intensively works on tremendous amount of data, which leads to high costs on the data bandwidth of the fabrications and power consumption of the datacenter.

Figure 3:
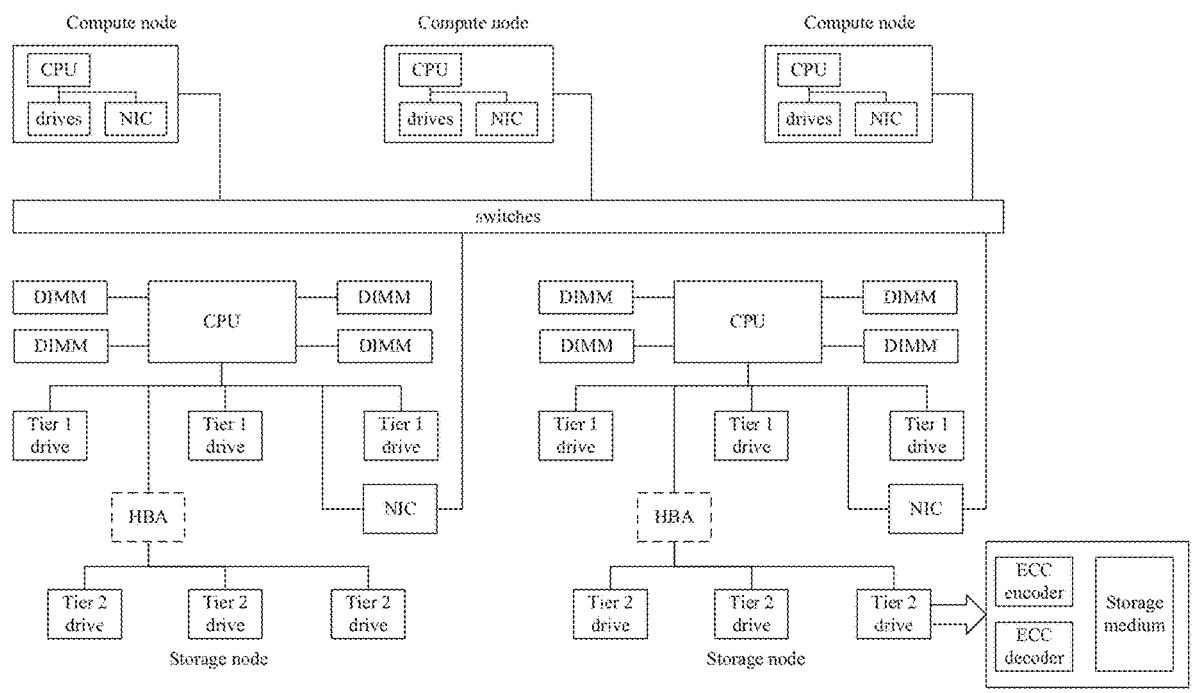
FIG. 3 is a schematic illustrating an example disaggregated architecture for hyperscale infrastructure, according to some embodiments of the present disclosure.

One solution is to employ clusters with flexible capacity adjustments. FIG. 3 is a schematic illustrating an example disaggregated architecture for hyperscale infrastructure, according to some embodiments of the present disclosure. As shown in FIG. 3, compute nodes and storage nodes can be communicatively coupled through switches. The compute nodes can be parts of a computer cluster, and the storage units can be parts of a storage cluster. In some embodiments, the switches include high-throughput Ethernet. The compute nodes and the storage nodes can be communicatively coupled for building up the clusters to accomplish compute/storage tasks. As shown in FIG. 3, thousands of storage drives in the storage nodes can be used in the storage cluster. Each drive can include at least one pair of ECC encoder and ECC decoder. Each pair of ECC encoder and decoder may account for the major cost in each drive in terms of capital expenditure ("CAPEX"), power consumption, latency, and reliability. The frequent toggling on each bit consumes intensively non-trivial resources. In addition, the frequent toggling is also likely to introduce errors, such as decoding failure, wrong convergence, etc. Modern storage devices, such as SSD, HDD, tape, or SCM, all utilizes the extremely strong ECC, which leads to considerable costs. For example, one data write can introduce multiple folds of encoding and decoding before the data is eventually placed into the long-term storage.

Figure 4A:
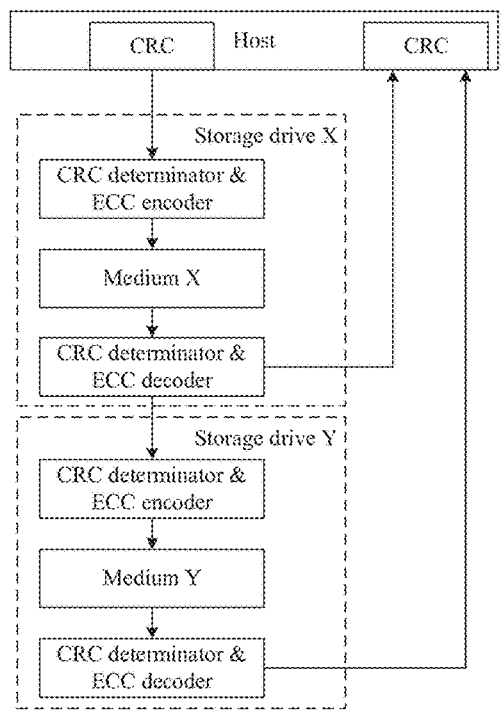
FIG. 4 is a schematic illustrating example improved systems to move data among hosts and storage drives, according to some embodiments of the present disclosure.

Embodiments of the present disclosure provide methods and systems with an expanded storage domain or cluster to improve on the issues described above. The storage domain or cluster can be expanded from one or more individual drives to the storage system comprising multiple drives or multiple tiers. Moreover, the storage medium can be expanded from one physical location to multiple locations (e.g., on a same storage drive), and from one medium to multiple kinds of medium. FIG. 4 is a schematic illustrating example improved systems to move data among hosts and storage drives, according to some embodiments of the present disclosure. As shown in FIG. 4(A), storage drive X and storage drive Y can be communicatively coupled to the host. In some embodiments, the host can be a part of a computer cluster, and storage drive X and storage drive Y can be a part of the storage cluster. Traditionally, each of storage drive X and storage drive Y may include an ECC encoder, a medium, and an ECC decoder. Each of storage drive X or storage drive Y may further include two CRC determinators, one before the data enters the medium and another after the data is loaded from the medium.

Figure 4B:
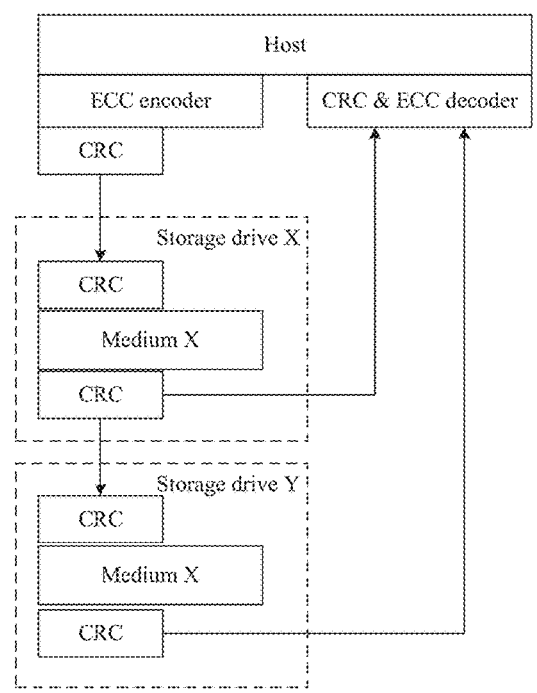

To reduce the runtime complexity when data is transferred in and out of the boundaries for storage drive X or storage drive Y, the ECC encoders and decoders may be moved out of the storage drives. In some embodiments, as shown in FIG. 4(B), the ECC encoders and decoders can be placed between the host from the computer cluster and the storage drives (e.g., storage drive X and storage drive Y) from the storage cluster. In some embodiments, the ECC encoders and decoders can be placed at an interface between the host and the drives. In some embodiments, the ECC encoders and decoders can be a part of the host. In some embodiments, data transfer among the storage drives can be conducted with CRC encoding and decoding to indicate that the received data in a destination drive is same as the data read out from the source drive. The data transfer among the storage drives, however, may not require ECC encoding. As a result, in some embodiments, there may be bit errors in the medium. The bit errors may be tolerated in the storage cluster. Before the data enters the computer cluster, the bit errors may be corrected according to ECC encoding performed by the ECC encoder and decoder shown in FIG. 4(B).

Figure 5:
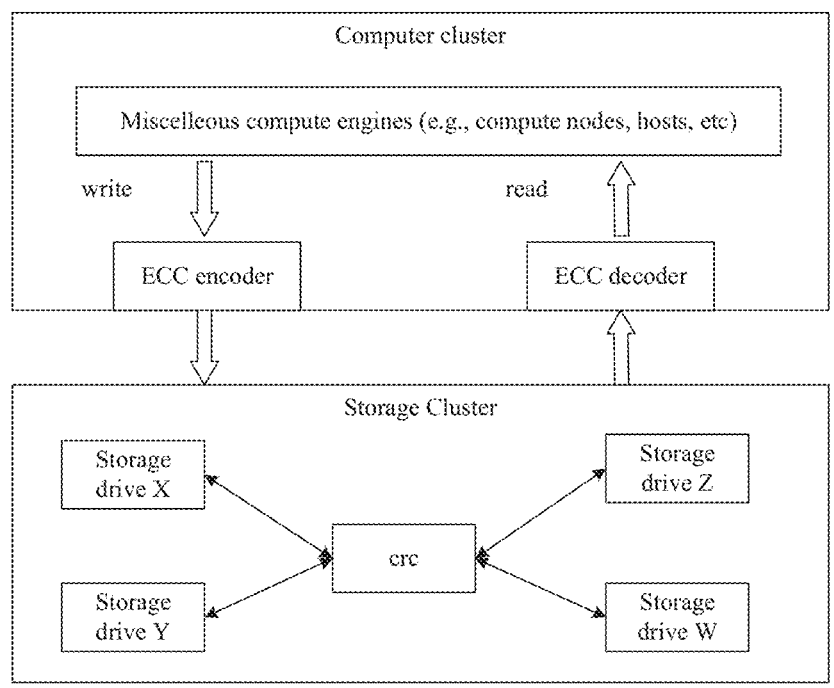
FIG. 5 is a schematic illustrating an example database system with improved ECC engines, according to some embodiments of the present disclosure.

FIG. 5 is a schematic illustrating an example database system with improved ECC engines, according to some embodiments of the present disclosure. As shown in FIG. 5, an ECC encoder and an ECC decoder can be placed between a computer cluster and a storage cluster. In some embodiments, the ECC encoder and the ECC decoder can be a part of the computer cluster.

In some embodiments, as shown in FIG. 5, the storage cluster can comprise a plurality of storage drives. In some embodiments, the plurality of storage drives can be different types of storage drives. In some embodiments, the plurality of storage drives can be grouped into multiple tiers. For example, as shown in FIG. 3, storage drives in the storage nodes can be tier-1 drives or tier-2 drives.

As shown in FIG. 5, the one or more communication channels between the computer cluster and the storage cluster can be protected with ECC provided by the ECC encoder and the ECC decoder. In some embodiments, the inter-transfer of data within the storage cluster (e.g., between different storage drives) can use CRC to check the data being transferred. For example, as shown in FIG. 5, data transfers between storage drive X and storage drive Y can be protected with CRC. When data is read out from storage drive X, a transferring CRC value can be determined according to the content of the data. When the data is transferred to storage drive Y, a receiving CRC value can be determined based on the content of the received data. The two CRC values can be compared to determine if the CRC values match, which in turn can signal if the received data is invalid.

In some embodiments, when data is transferred from the computer cluster to the storage cluster, the ECC encoder and the ECC decoder can be paired with CRC determinations to check that the data decoded from the drives is the original data. For example, when data is written into the storage cluster from the computer cluster, a signature CRC value can be determined according to the content of the data. This signature CRC value may be stored in the computer cluster, and the data may be stored into the storage cluster. Later when the data is retrieved from a storage cluster to the computer cluster, the CRC determination can be processed on the retrieved data to determine a receiving CRC value. If the signature CRC value matches the receiving CRC value, the data may be determined to be valid.

As shown in FIG. 4 and FIG. 5, there can be two types of data transfers. A first type of data transfers is between a compute node in a computer cluster and a storage node in a storage cluster. A second type of data transfers is inside the storage cluster. The second type of data transfers are within the storage cluster. For example, the second type of data transfers can be between different storage drives, between different tiers of storage drives, or between different locations in a storage drive. The first type of data transfers is protected with both ECC encoding and CRC values, and the second type of data transfers is protected with CRC values. In the first type of data transfers, the data being transferred can be validated according to ECC encoding and CRC values. In the second type of data transfers, the data being transferred can be validated according to CRC values. In the second type of data transfers, the data being transferred can be encoded with ECC when the data is first saved into the storage cluster from the computer cluster. When the second type of data transfers is performed, the ECC encoding may not need to be decoded in the transferring process. Moreover, when the data is written into a destination medium according to the second type of data transfers, the data can still include the ECC encoding.

Figure 6:
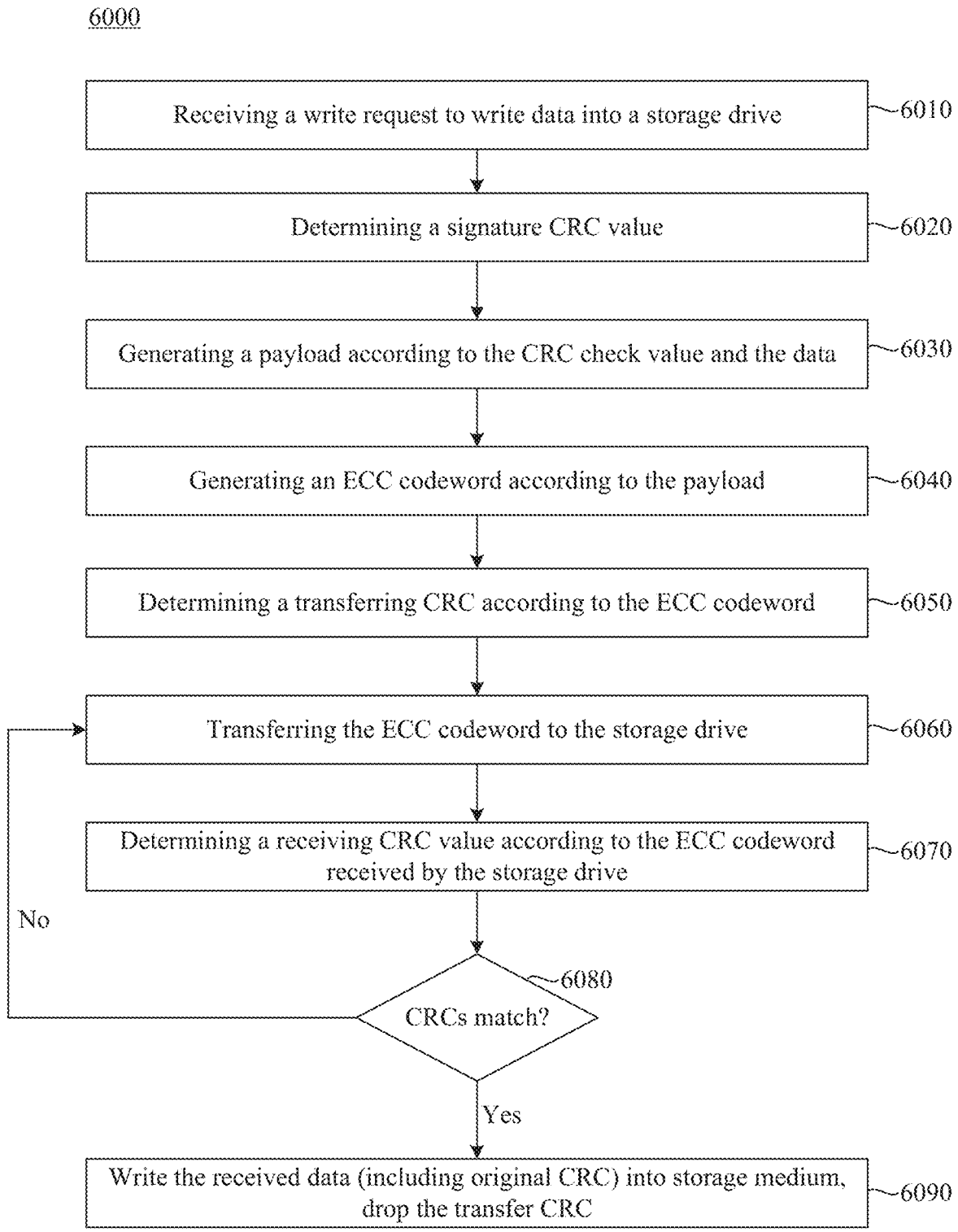
FIG. 6 is a flowchart illustrating an example write operation from a host to a storage drive with improved error corrections, according to some embodiments of the present disclosure.

Embodiments of the present disclosure further provide a method for a write operation from a host to a storage drive with improved error corrections. FIG. 6 is a flowchart illustrating an example write operation from a host to a storage drive with improved error corrections, according to some embodiments of the present disclosure. It is appreciated that method 6000 shown in FIG. 6 can be performed by the system of FIG. 4(B) or the system of FIG. 5.

In step 6010, a write request to write data into a storage drive (e.g., a data transfer request) is received. In some embodiments, the write request can be from one or more applications, one or more clients or users, or one or more files. In some embodiments, the write request is received in a host. The host can be a part of a computer cluster (e.g., computer cluster of FIG. 5). In some embodiments, the write request is received in a compute node in a computer cluster (e.g., compute nodes shown in FIG. 5). In some embodiments, the write request is sent from an application operating on the host or the computing node.

In step 6020, a signature CRC value for the data can be determined. The CRC encoding can detect accidental changes to raw data. In some embodiments, the signature CRC value corresponding to the data can be stored in the host. When the data is later read out from the storage drive, a new CRC value can be generated for the data that is read out. The new CRC value can be compared with the signature CRC value stored in the host to determine if the data that is read out matches the data that was stored into the storage drive. In some embodiments, the signature CRC value can be determined by generating a check value for the data according to the contents in the data. In some embodiments, if the check values do not match, corrective action can be taken against data corruption.

In step 6030, a payload is generated by combining the signature CRC value and the data. When the payload is generated, the payload can include the signature CRC value and the data. In some embodiments, the signature CRC value can be appended behind the data to form the payload.

In step 6040, an ECC codeword can be generated according to the payload. In some embodiments, an ECC encoder (e.g., ECC encoder of FIG. 4(B) or FIG. 5) can perform ECC encoding on the payload. In some embodiments, the ECC encoding can add one or more redundant bits to it. When the original data is reconstructed or retrieved from the storage drive, an ECC decoder can examine the encoded message to check for any errors. In some embodiments, the ECC encoding can generate an ECC parity for the payload. For example, the ECC encoding can generate an ECC parity bit for the payload, and the ECC parity bit may be used for error detection. The parity bit can also be included as a part of the ECC codeword.

In step 6050, a transferring CRC value is determined according to the ECC codeword. The transferring CRC value is used for performing CRC checks when the ECC codeword is transferred from the host in the computer cluster into a storage cluster. For example, as shown in FIG. 4(B), when data is transferred to storage drive X from the host, a CRC encoding is performed.

In step 6060, the ECC codeword is transferred to the storage drive. In some embodiments, the storage drive is a part of a storage cluster. For example, as shown in FIG. 5, for a write command, the data is transferred from a computer cluster into a storage drive in a storage cluster. In some embodiments, the transferring CRC value can be transferred to the storage drive along with the ECC codeword.

In step 6070, a receiving CRC value is determined according to the ECC codeword received by the storage drive. For example, as shown in FIG. 4(B), when the data is received by storage drive X, a receiving CRC value can be determined.

In step 6080, it is determined if the receiving CRC value matches the transferring CRC value. For example, as shown in FIG. 4(B), when data is transferred from the host to storage drive X, a transferring CRC value can be generated according to the data at the host, and a receiving CRC value can be generated according to the data received by storage drive X. The transferring CRC value can be compared with the receiving CRC value to determine if they match. If it is determined that there is a match, the ECC codeword can be written into the storage drive, and step 6090 may be executed. In some embodiments, if it is determined that there is no match, a new transferring CRC value can be generated in the host and the ECC codeword can be transferred again from the host to the storage drive. As a result, step 6050 may be executed. In some embodiments, it is appreciated that steps 6050, 6070, and 6080 can be generally considered as parts of a CRC check process for data being transferred from a host to a storage drive.

In step 6090, in response to a determination that the transferring CRC value matches the receiving CRC value, the ECC codeword is written into the storage drive. In some embodiments, the ECC codeword can include the original data, the ECC encoding, and the signature CRC value.

Figure 7:
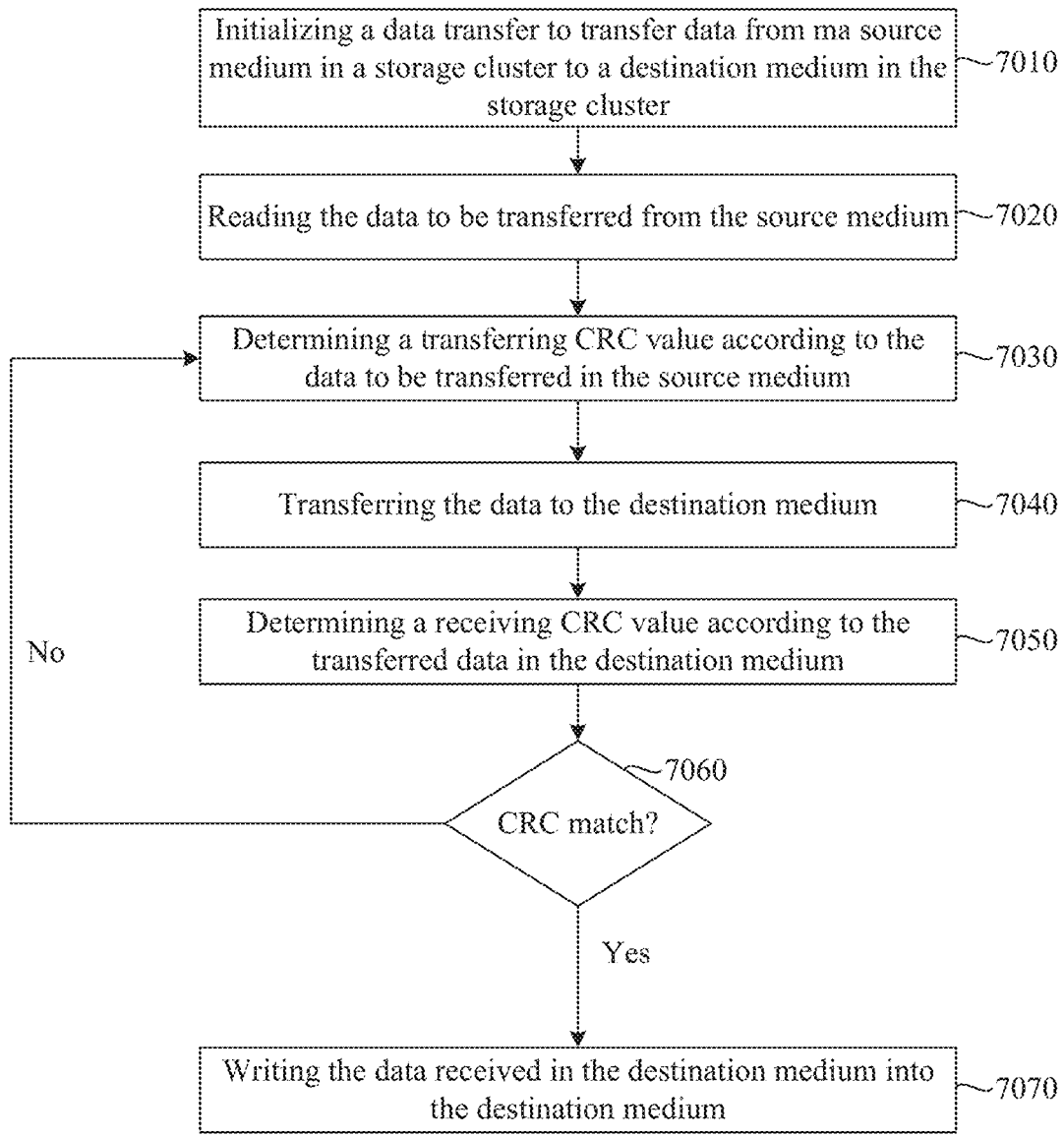
FIG. 7 is a flowchart illustrating an example method of performing a write operation in a storage cluster with improved error corrections, according to some embodiments of the present disclosure.

Embodiments of the present disclosure further provide a method for performing write operations in a storage cluster with improved error corrections. FIG. 7 is a flowchart illustrating an example method of performing a write operation in a storage cluster with improved error corrections, according to some embodiments of the present disclosure. In some embodiments, method 7000 shown in FIG. 7 can be performed for data transfers between storage drives, between tiers, or between different locations in a storage drive. It is appreciated that method 7000 shown in FIG. 7 can be performed by the system shown in FIG. 4(B) or the system shown in FIG. 5. It is also appreciated that method 7000 shown in FIG. 7 can be performed by a same data storage system configured to perform method 6000 shown in FIG. 6.

In step 7010, a data transfer is initialized to transfer data from a source medium in a storage cluster to a destination medium in the storage cluster. In some embodiments, the source medium and the destination medium can be different storage drives in the storage cluster, different tiers of storage drives in the storage cluster, or different locations in one storage drive of the storage cluster.

In step 7020, data to be transferred is read from the source medium. In some embodiments, the data that is read out includes ECC encodings. The ECC encodings on the data is encoded in a host from a computer cluster when the data was transferred from the host to the storage cluster. For example, as shown in method 6000 of FIG. 6, an ECC codeword can be generated in the host (e.g., step 6040), and the ECC codeword can be transferred to the storage drive in the storage cluster (e.g., step 6060). When the data stored in the ECC codeword is transferred to the destination medium in the storage cluster, the ECC codeword can be transferred altogether.

In step 7030, a transferring CRC value is determined according to the data. The transferring CRC value is used for performing CRC checks when the transferring data is transferred from the source medium in the storage cluster into the destination medium in the storage cluster. For example, as shown in FIG. 5, when data is transferred to storage drive Y from storage drive X, a CRC encoding is performed.

In step 7040, the data is transferred to the destination medium. For example, as shown in FIG. 5, for a data transfer command, data can be transferred from a storage drive in the storage cluster (e.g., storage drive X) into other storage drives in the storage cluster (e.g., storage drive Y). In some embodiments, the transferring CRC value can be transferred to the destination medium along with the data.

In step 7050, a receiving CRC value is determined according to the data received by the destination medium. For example, as shown in FIG. 5, when the data is received by storage drive Y, a receiving CRC value can be determined.

In step 7060, it is determined if the receiving CRC value matches the transferring CRC value. For example, as shown in FIG. 5, when data is transferred from storage drive X to storage drive Y, a transferring CRC value can be generated according to the data in storage drive X, and a receiving CRC value can be generated according to the data received by storage drive Y. The transferring CRC value can be compared with the receiving CRC value to determine if they match. If it is determined that there is a match, the data received by destination medium can be written into the destination medium, and step 7070 may be executed. In some embodiments, if it is determined that there is no match, a new transferring CRC code can be determined and the data can be transferred again. As a result, step 7030 may be executed. In some embodiments, it is appreciated that steps 7030, 7050 and 7060 can be generally considered as parts of a CRC check process for data being transferred from the source medium to the destination medium in the storage cluster.

In step 7070, in response to a determination that the transferring CRC value matches the receiving CRC value, the data received in the destination medium is written into the destination medium.

Figure 8:
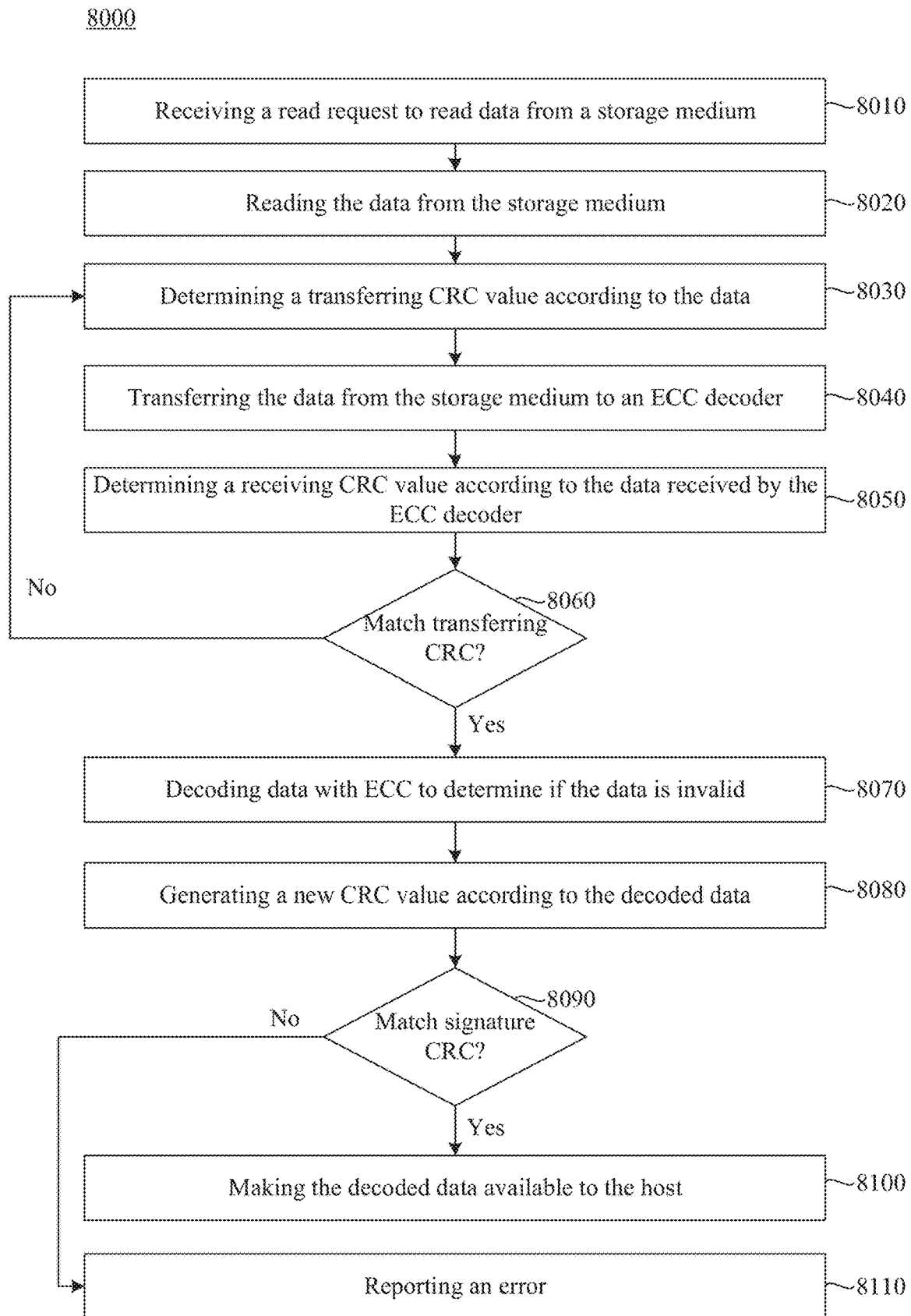
FIG. 8 is a flowchart illustrating an example read operation from a storage drive in a storage cluster to a host in a computer cluster with improved error corrections, according to some embodiments of the present disclosure.

Embodiments of the present disclosure further provide a method for a read operation from a storage drive in a storage cluster to a host in a computer cluster with improved error corrections. FIG. 8 is a flowchart illustrating an example read operation from a storage drive in a storage cluster to a host in a computer cluster with improved error corrections, according to some embodiments of the present disclosure. It is appreciated that method 8000 shown in FIG. 8 can be performed by the system shown in FIG. 4(B) or the system shown in FIG. 5. It is also appreciated that method 8000 shown in FIG. 8 can be performed by a same data storage system configured to perform method 6000 shown in FIG. 6 or method 7000 of FIG. 7.

In step 8010, a read request or a data transfer request to read data from a storage medium is received. In some embodiments, the read request can be from one or more applications, one or more clients or users, or one or more files. In some embodiments, the read request is received in a host. The host can be a part of a computer cluster (e.g., computer cluster of FIG. 5). In some embodiments, the read request is sent from an application operating on the host. In some embodiments, the host can be considered as a destination medium for the read request. In some embodiments, the storage medium can be a storage drive in a storage cluster. In some embodiments, the storage medium can be a location in a storage drive of the storage cluster. In some embodiments, the storage medium can be considered as the source medium for the data transfer, and the host can be considered as the destination medium for the data transfer.

In step 8020, the data is read from the storage medium. In some embodiments, the data that is read out includes ECC encodings. In some embodiments, the ECC encodings on the data is encoded in a host from a computer cluster. For example, as shown in method 6000 of FIG. 6, an ECC codeword can be generated in the host (e.g., step 6040), and the ECC codeword can be transferred to the storage drive in the storage cluster (e.g., step 6060). When the data stored in the ECC codeword is read from the storage medium in the storage cluster, the ECC codeword can be read and transferred altogether.

In step 8030, a transferring CRC value is determined according to the data. The transferring CRC value is used for performing CRC checks when the data is transferred from storage medium of the storage cluster into the host of the computer cluster. For example, as shown in FIG. 4(B), when data is transferred from storage drive X to the host, a CRC encoding is performed.

In step 8040, the data is transferred from the storage medium to an ECC decoder. In some embodiments, the ECC decoder is a part of the host in the computer cluster. For example, as shown in FIG. 5, for a read command, the data is transferred from a storage drive in a storage cluster into an ECC decoder in a computer cluster. In some embodiments, the transferring CRC value can be transferred to the ECC decoder along with the ECC codeword.

In step 8050, a receiving CRC value is determined according to the data received by the ECC decoder. For example, as shown in FIG. 4(B), when the data is received by the ECC decoder, a receiving CRC value can be determined. In some embodiments, the receiving CRC value can be determined by the ECC decoder.

In step 8060, it is determined if the receiving CRC value matches the transferring CRC value. For example, as shown in FIG. 4(B), when data is transferred from the storage drive X to ECC decoder, a transferring CRC value can be generated according to the data at the storage drive, and a receiving CRC value can be generated according to the data received by ECC decoder. The transferring CRC value can be compared with the receiving CRC value to determine if they match. If it is determined that there is a match, the data can be further processed by the ECC decoder, and step 8070 may be executed. In some embodiments, if it is determined that there is no match, a new transferring CRC value can be generated and the data can be transferred again from the storage medium to the ECC decoder. As a result, step 8030 may be executed. In some embodiments, it is appreciated that steps 8030, 8050, and 8060 can be generally considered as parts of a CRC check process for data being transferred from the storage cluster to the computer cluster.

In step 8070, in response to a determination that the receiving CRC value matches the transferring CRC value, the data is decoded with ECC to determine if the data is invalid. In some embodiments, the ECC decoder (e.g., ECC decoder of FIG. 4(B) or FIG. 5) can perform ECC decoding on the data. In some embodiments, the ECC decoding can determine if the data includes errors. If the data includes errors, it is invalid. For example, the ECC encoding performed by an ECC encoder (e.g., ECC encoder in FIG. 4(B) or FIG. 5) can generate an ECC parity bit for the data, which can be obtained again from ECC decoding. The ECC parity bit may be used for error detection. In some embodiments, if the data is determined to be invalid, an error message can be reported to the entity that issued the read request. If the data is not invalid according to the ECC decoding, step 8080 can be executed.

In step 8080, in response to a determination that the decoded data is not invalid, a new CRC value is generated according to the decoded data. In some embodiments, the new CRC value is generated to be compared with a signature CRC value corresponding to the data. In some embodiments, the signature CRC value a part of the data and can be extracted from the data. In some embodiments, the signature CRC value is stored in the host and can be extracted from the host. The signature CRC value corresponds to the data and is generated when the data was written from the host into the storage drive (e.g., step 6020 shown in FIG. 6).

In step 8090, it is determined if the new CRC value matches a signature CRC value corresponding to the data. By determining if the new CRC value matches the signature CRC value, it can be determined if the data that is read out from the storage medium matches the data that was stored into the storage drive from a write operation. If the new CRC value matches the signature CRC value, step 8100 is executed. In some embodiments, if the new CRC value does not match the signature CRC value, an error may be reported, and step 8110 can be executed.

In step 8100, in response to a determination that the new CRC value matches the signature CRC value, the decoded data is made available to the host. In some embodiments, the decoded data is made available to the entity that issued the read request. In some embodiments, the entity that issued the read request can be one or more applications, one or more clients or users, or one or more files.

In step 8110, in response to the new CRC value not matching the signature CRC value, an error is reported. In some embodiments, the error can be reported to the entity that issued the read request, such as one or more applications, one or more clients or users, or one or more files. In some embodiments, after the error has been reported, a repairing session can be initiated to remedy the mismatch between the new CRC value and the signature CRC value.

Embodiments of the present disclosure provide novel systems and methods for error correction by allowing the storage medium to hold noisy data or ECC encoded data and enforcing CRC-based checks for data transfers within a storage cluster or storage domain. The improved error correction design can reduce cost, latency, and complexity significantly. The ECC encoder and decoder can be used at the interface between a computer cluster and a storage cluster, and allow the data transfers within the storage cluster to drop the ECC encoding process. As a result, ECC encoding may not need to be instantiated and distributed into the storage drives. Moreover, when the data is extracted from the storage cluster for computational purposes, the accuracy of the data can be checked using ECC encoding. The tremendous duplicative hardware resources in storage drives is reduced, and the operative cost of performing data transfers between the storage drives is reduced within the storage cluster.

Figure 9:
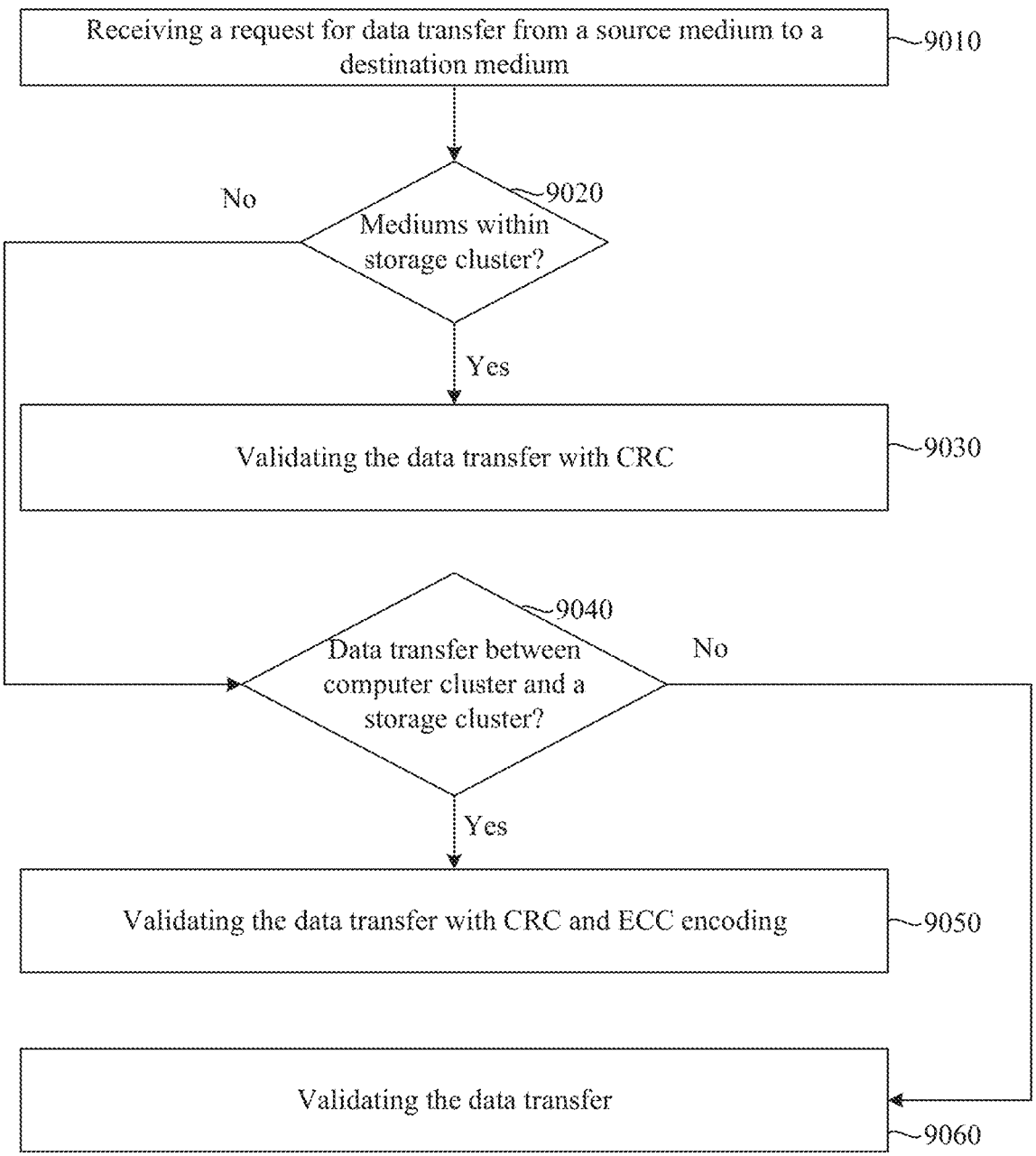
FIG. 9 is a flowchart illustrating an example data transfer in a data storage system with improved error corrections, according to some embodiments of the present disclosure.

Embodiments of the present disclosure further provide a method for data transfer with improved error corrections. FIG. 9 is a flowchart illustrating an example data transfer in a data storage system with improved error corrections, according to some embodiments of the present disclosure. It is appreciated that method 9000 shown in FIG. 9 can be performed by the system shown in FIG. 4(B) or the system shown in FIG. 5. It is also appreciated that method 9000 shown in FIG. 9 can be performed by a same data storage system configured to perform method 6000 shown in FIG. 6, method 7000 of FIG. 7, or method 8000 of FIG. 8.

In step 9010, a request for data transfer from a source medium in the data storage system to a destination medium in the data storage system is received. The data storage system comprises a computer cluster and a storage cluster. The source medium and the destination medium can be a part of the computer cluster or a storage cluster.

In step 9020, it is determined if the source medium and the destination medium are within the storage cluster. If it is determined that the source medium and the destination medium are within the storage cluster, step 9030 can be executed. If it is determined that the source medium and the destination medium are not within the storage cluster, step 9040 can be executed.

In step 9030, in response to a determination that the source medium and the destination medium are within the storage cluster, the data transfer is validated with a CRC. For example, as shown in method 7000 of FIG. 7, the receiving CRC value and the transferring CRC value can be generated, and the CRC values can be compared to determine if the CRC values match. If the CRC values do not match, the data can be determined to be invalid. In some embodiments, similar to method 7000 of FIG. 7, the data stored in the source medium includes ECC encoding, and the ECC is encoded when the data is first transferred from the computer cluster to the storage cluster. In some embodiments, similar to method 7000 of FIG. 7, the source medium and the destination medium can be storage drives, tiers, or different locations in a storage drive.

In step 9040, in response to a determination that the source medium and the destination medium are not within the storage cluster, it is determined if the data transfer is between a computer cluster and a storage cluster. In some embodiments, the data transfer is between a computer cluster and a storage cluster when one of the source medium and the destination medium is within the computer cluster and another of the source medium and the destination medium is within the storage cluster. If the data transfer is between a computer cluster and a storage cluster, step 9050 can be executed. In some embodiments, if the data transfer is not between a computer cluster and a storage cluster, the data transfer can be validated, and step 9060 can be executed.

In step 9050, in response to a determination that the data transfer is between a computer cluster and a storage cluster, the data transfer is validated with CRC and ECC encoding. For example, as shown in method 6000 of FIG. 6, when a data transfer is received to transfer data from the computer cluster to the storage cluster, the CRC values can be generated to check if they match, and an ECC encoding can be performed to generate the ECC codeword. In addition, as shown in method 8000 of FIG. 8, when a data transfer is received to transfer data from the storage cluster to the computer cluster, the CRC values can be generated to check if they match, and an ECC decoding can be performed to determine if the data transfer is invalid.

In step 9060, in response to a determination that the data transfer is not between a computer cluster and a storage cluster, the data transfer can be validated. In some embodiments, the data transfer can be validated with validation methods used in the host of the system. In some embodiments, the data transfer can be validated with methods including CRC or ECC encoding.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The data storage system, secondary storage unit, other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for transferring data in a data storage system, the method comprising:

receiving a request for data transfer from a source medium in the data storage system to a destination medium in the data storage system, wherein the data storage system comprises a computer cluster and a storage cluster;

determining whether the source medium and the destination medium are within the storage cluster; and based on the determination of whether the source medium and the destination medium are within the storage cluster, transferring the data from the source medium to the destination medium, wherein:

the data is transferred without performing error correcting code check when the data is transferred within the storage cluster, and the data is transferred with an error correcting code check when the data is transferred between the computer cluster and the storage cluster.

2. The method of clause 1, further comprising:
reading the data from the source medium;
generating a transferring cyclic redundancy check value according to the data;
generating a receiving cyclic redundancy check value according to the data transferred to the destination medium;
determining whether the transferring cyclic redundancy check value matches with the receiving cyclic redundancy check value; and
in response to a determination that the transferring cyclic redundancy check value does not match with the receiving cyclic redundancy check value, determining that the data transfer is invalid.

3. The method of clause 2, further comprising:
in response to a determination that the data transfer is not invalid, writing the data in the destination medium, wherein:
the data written in the destination medium includes error correcting code when the data is transferred within the storage cluster, and the error correcting code being generated when the data is transferred from the computer cluster to the storage cluster.

4. The method of clause 2 or 3, wherein the source medium and the destination medium are different locations in a storage drive of the storage cluster when the data is transferred within the storage cluster.

5. The method of any one of clauses 2-4, further comprising:
in response to a determination that the data transfer is invalid, initiating a new data transfer for the data.

6. The method of clause 5, further comprising:
determining whether the source medium is in the computer cluster and the destination medium is in the storage cluster; and
in response to a determination that the source medium is in the computer cluster and the destination medium is in the storage cluster:
generating an error correcting code codeword by encoding the data with error correcting code, wherein the error correcting code codeword is transferred to the destination medium in the storage cluster from the source medium in the computer cluster.

7. The method of clause 6, further comprising:
in response to a determination that the source medium is in the computer cluster and the destination medium is in the storage cluster:
generating a signature cyclic redundancy check value according to the data in the source medium, and
inserting the signature cyclic redundancy check value into the data.

8. The method of clause 6 or 7, further comprising:
determining whether the source medium is in the storage cluster and the destination medium is in the computer cluster; and
in response to a determination that the source medium is in the storage cluster and the destination medium is in the computer cluster:

determining whether the data is invalid by decoding an error correcting code in the data, wherein the error correcting code is encoded when the data is transferred from the computer cluster to the storage cluster.

9. The method of clause 8, further comprising:
in response to a determination that the source medium is in the storage cluster and the destination medium is in the computer cluster:
generating a cyclic redundancy check value according to the decoded data in the destination medium in the computer cluster;
determining whether the cyclic redundancy check value matches with a signature cyclic redundancy check value, wherein the signature cyclic redundancy check value is generated when the data is transferred from the computer cluster to the storage cluster; and
in response to a determination that the cyclic redundancy check value does not match with the signature cyclic redundancy check value, determining that the data transfer is invalid.

10. A non-transitory computer readable medium that stores a set of instructions that is executable by at least one processor of a data storage system to cause the data storage system to perform a method for transferring data, the method comprising:

receiving a request for data transfer from a source medium in the data storage system to a destination medium in the data storage system, wherein the data storage system comprises a computer cluster and a storage cluster;
determining whether the source medium and the destination medium are within the storage cluster;
in response to a determination that the source medium and the destination medium are within the storage cluster:
transferring the data including error correcting code from the source medium to the destination medium, the error correcting code being encoded when the data is transferred from the computer cluster to the storage cluster, and
validating the data transfer with a cyclic redundancy check.

11. The non-transitory computer readable medium of clause 10, wherein the set of instructions is executable by the at least one processor of the data storage system to cause the data storage system to further perform:
reading the data from the source medium;
generating a transferring cyclic redundancy check value according to the data;
generating a receiving cyclic redundancy check value according to the data transferred to the destination medium;
determining whether the transferring cyclic redundancy check value matches with the receiving cyclic redundancy check value; and
in response to a determination that the transferring cyclic redundancy check value does not match with the receiving cyclic redundancy check value, determining that the data transfer is invalid.

12. The non-transitory computer readable medium of clause 11, wherein the set of instructions is executable by the at least one processor of the data storage system to cause the data storage system to further perform:
in response to a determination that the data transfer is invalid, initiating a new data transfer for the data; and
in response to a determination that the data transfer is not invalid, writing the data in the destination medium, wherein the data written in the destination medium includes error correcting code, and the error correcting code is generated when the data is transferred from the computer cluster to the storage cluster.

13. The non-transitory computer readable medium of clause 11 or 12, wherein the source medium and the destination medium are different locations in a storage drive of the storage cluster.

14. The non-transitory computer readable medium of any one of clauses 10-13, wherein the set of instructions is executable by the at least one processor of the computer system to cause the computer system to further perform:
in response to a determination that the source medium and the destination medium are not within the storage cluster, determining whether one of the source medium and the destination medium is within the computer cluster and another of the source medium and the destination medium is within the storage cluster; and
in response to a determination that the one of the source medium and the destination medium is within the computer cluster and another of the source medium and the destination medium is within the storage cluster:
 transferring the data from the source medium to the destination medium, and
 validating the data transfer with a cyclic redundancy check and error correcting code encoding.

15. The non-transitory computer readable medium of clause 14, wherein the set of instructions is executable by the at least one processor of the data storage system to cause the data storage system to further perform:
in response to the determination that the one of the source medium and the destination medium is within the computer cluster and another of the source medium and the destination medium is within the storage cluster:
 determining whether the source medium is in the computer cluster; and
 in response to a determination that the source medium is in the computer cluster:
  generating an error correcting code codeword by encoding the data with error correcting code, wherein the error correcting code codeword is transferred to the destination medium in the storage cluster.

16. The non-transitory computer readable medium of clause 15, wherein the set of instructions is executable by the at least one processor of the data storage system to cause the data storage system to further perform:
in response to a determination that the source medium is in the computer cluster:
 generating a signature cyclic redundancy check value according to the data in the source medium, and
 inserting the signature cyclic redundancy check value into the data.

17. The non-transitory computer readable medium of clause 14, wherein the set of instructions is executable by the at least one processor of the data storage system to cause the data storage system to further perform:
determining whether the source medium is in the storage cluster; and
in response to a determination that the source medium is in the storage cluster:
 determining whether the data is invalid according to an error correcting code in the data, wherein the error correcting code is encoded when the data is transferred from the computer cluster to the storage cluster.

18. The non-transitory computer readable medium of clause 17, wherein the set of instructions is executable by the at least one processor of the data storage system to cause the data storage system to further perform:
in response to a determination that the source medium is in the storage cluster:
 generating a cyclic redundancy check value according to the decoded data in the destination medium;
 determining if the cyclic redundancy check value matches with a signature cyclic redundancy check value, wherein the signature cyclic redundancy check value is generated when the data is transferred from the computer cluster to the storage cluster;
 in response to a determination that the cyclic redundancy check value does not match with the signature cyclic redundancy check value, determining that the data transfer is invalid.

19. A data storage system, comprising:
a computer cluster;
a storage cluster;
one or more memories storing a set of instructions; and
one or more processors configured to execute the set of instructions to cause the system to perform:
 receiving a request for data transfer from a source medium in the data storage system to a destination medium in the data storage system;
 determining whether the source medium and the destination medium are within the storage cluster;
 in response to a determination that the source medium and the destination medium are within the storage cluster:
  transferring the data including error correcting code from the source medium to the destination medium, the error correcting code being encoded when the data is transferred from the computer cluster to the storage cluster, and
  validating the data transfer with a cyclic redundancy check.

20. The data storage system of clause 19, wherein the one or more processors are further configured to execute the set of instructions to cause the system to perform:
reading the data from the source medium;
generating a transferring cyclic redundancy check value according to the data;
generating a receiving cyclic redundancy check value according to the data transferred to the destination medium;
determining whether the transferring cyclic redundancy check value matches with the receiving cyclic redundancy check value; and
in response to a determination that the transferring cyclic redundancy check value does not match with the receiving cyclic redundancy check value, determining that the data transfer is invalid.

21. The data storage system of clause 20, wherein the one or more processors are further configured to execute the set of instructions to cause the system to perform:
in response to a determination that the data transfer is invalid, initiating a new data transfer for the data; and
in response to a determination that the data transfer is not invalid, writing the data in the destination medium, wherein the data written in the destination medium includes error correcting code, and the error correcting code is generated when the data is transferred from the computer cluster to the storage cluster.

22. The data storage system of clause 20 or 21, wherein the source medium and the destination medium are different locations in a storage drive of the storage cluster.

23. The data storage system of any one of clauses 19-22, wherein the one or more processors are further configured to execute the set of instructions to cause the system to perform:

in response to a determination that the source medium and the destination medium are not within the storage cluster, determining whether one of the source medium and the destination medium is within the computer cluster and another of the source medium and the destination medium is within the storage cluster; and in response to a determination that the one of the source medium and the destination medium is within the computer cluster and another of the source medium and the destination medium is within the storage cluster:

transferring the data from the source medium to the destination medium, and validating the data transfer with a cyclic redundancy check and error correcting code encoding.

24. The data storage system of clause 23, wherein the one or more processors are further configured to execute the set of instructions to cause the system to perform:

in response to the determination that the one of the source medium and the destination medium is within the computer cluster and another of the source medium and the destination medium is within the storage cluster:

determining whether the source medium is in the computer cluster; and in response to a determination that the source medium is in the computer cluster:

generating an error correcting code codeword by encoding the data with error correcting code, wherein the error correcting code codeword is transferred to the destination medium in the storage cluster.

25. The data storage system of clause 24, wherein validating the data transfer with a cyclic redundancy check and error correcting code encoding further comprises:

in response to a determination that the source medium is in the computer cluster:

generating a signature cyclic redundancy check value according to the data in the source medium, and inserting the signature cyclic redundancy check value into the data.

26. The data storage system of clause 23, wherein the one or more processors are further configured to execute the set of instructions to cause the system to perform:

determining whether the source medium is in the storage cluster; and in response to a determination that the source medium is in the storage cluster:

transferring the data to the destination medium in the storage cluster;

determining whether the data is invalid according to an error correcting code in the data, wherein the error correcting code is encoded when the data is transferred from the computer cluster to the storage cluster.

27. The data storage system of clause 26, wherein the one or more processors are further configured to execute the set of instructions to cause the system to perform:

in response to a determination that the source medium is in the storage cluster:

generating a cyclic redundancy check value according to the decoded data in the destination medium;

determining if the cyclic redundancy check value matches with a signature cyclic redundancy check value, wherein the signature cyclic redundancy check value is generated when the data is transferred from the computer cluster to the storage cluster; in response to a determination that the cyclic redundancy check value does not match with the signature cyclic redundancy check value, determining that the data transfer is invalid.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for transferring data in a data storage system, the method comprising:

receiving a request for data transfer from a source medium in the data storage system to a destination medium in the data storage system, wherein the data storage system comprises a computer cluster and a storage cluster;

determining whether the source medium and the destination medium are within the storage cluster; and based on the determination of whether the source medium and the destination medium are within the storage cluster, transferring the data from the source medium to the destination medium, wherein:

the data is transferred without performing error correcting code check when the data is transferred within the storage cluster, and the data is transferred with an error correcting code check when the data is transferred between the computer cluster and the storage cluster.

2. The method of claim 1, further comprising:

reading the data from the source medium;

generating a transferring cyclic redundancy check value according to the data;

generating a receiving cyclic redundancy check value according to the data transferred to the destination medium;

determining whether the transferring cyclic redundancy check value matches with the receiving cyclic redundancy check value; and in response to a determination that the transferring cyclic redundancy check value does not match with the receiving cyclic redundancy check value, determining that the data transfer is invalid.

3. The method of claim 2, further comprising:

in response to a determination that the data transfer is not invalid, writing the data in the destination medium, wherein:

the data written in the destination medium includes error correcting code when the data is transferred within the storage cluster, the error correcting code being generated when the data is transferred from the computer cluster to the storage cluster.

4. The method of claim 2, wherein the source medium and the destination medium are different locations in a storage drive of the storage cluster when the data is transferred within the storage cluster.

5. The method of claim 2, further comprising:

in response to a determination that the data transfer is invalid, initiating a new data transfer for the data.

6. The method of claim 1, further comprising:

determining whether the source medium is in the computer cluster and the destination medium is in the storage cluster; and in response to a determination that the source medium is in the computer cluster and the destination medium is in the storage cluster:
generating an error correcting code codeword by encoding the data with error correcting code, wherein the error correcting code codeword is transferred to the destination medium in the storage cluster from the source medium in the computer cluster.

7. The method of claim 6, further comprising:
in response to a determination that the source medium is in the computer cluster and the destination medium is in the storage cluster:
generating a signature cyclic redundancy check value according to the data in the source medium, and inserting the signature cyclic redundancy check value into the data.

8. The method of claim 6, further comprising:
determining whether the source medium is in the storage cluster and the destination medium is in the computer cluster; and
in response to a determination that the source medium is in the storage cluster and the destination medium is in the computer cluster:
determining whether the data is invalid by decoding an error correcting code in the data, wherein the error correcting code is encoded when the data is transferred from the computer cluster to the storage cluster.

9. The method of claim 8, further comprising:
in response to a determination that the source medium is in the storage cluster and the destination medium is in the computer cluster:
generating a cyclic redundancy check value according to the decoded data in the destination medium in the computer cluster;
determining whether the cyclic redundancy check value matches with a signature cyclic redundancy check value, wherein the signature cyclic redundancy check value is generated when the data is transferred from the computer cluster to the storage cluster; and
in response to a determination that the cyclic redundancy check value does not match with the signature cyclic redundancy check value, determining that the data transfer is invalid.

10. A non-transitory computer readable medium that stores a set of instructions that is executable by at least one processor of a data storage system to cause the data storage system to perform a method for transferring data, the method comprising:
receiving a request for data transfer from a source medium in the data storage system to a destination medium in the data storage system, wherein the data storage system comprises a computer cluster and a storage cluster;
determining whether the source medium and the destination medium are within the storage cluster;
in response to a determination that the source medium and the destination medium are within the storage cluster:
transferring the data including error correcting code from the source medium to the destination medium, the error correcting code being encoded when the data is transferred from the computer cluster to the storage cluster, and
validating the data transfer with a cyclic redundancy check.

11. The non-transitory computer readable medium of claim 10, wherein the set of instructions is executable by the at least one processor of the data storage system to cause the data storage system to further perform:
in response to a determination that the source medium and the destination medium are not within the storage cluster, determining whether one of the source medium and the destination medium is within the computer cluster and another of the source medium and the destination medium is within the storage cluster; and
in response to a determination that the one of the source medium and the destination medium is within the computer cluster and another of the source medium and the destination medium is within the storage cluster:
transferring the data from the source medium to the destination medium, and validating the data transfer with a cyclic redundancy check and error correcting code encoding.

12. The non-transitory computer readable medium of claim 11, wherein the set of instructions is executable by the at least one processor of the data storage system to cause the data storage system to further perform:
in response to a determination that the one of the source medium and the destination medium is within the computer cluster and another of the source medium and the destination medium is within the storage cluster:
determining whether the source medium is in the storage cluster; and
in response to a determination that the source medium is in the storage cluster:
determining whether the data is invalid according to an error correcting code in the data, wherein the error correcting code is encoded when the data is transferred from the computer cluster to the storage cluster.

13. A data storage system, comprising:
a computer cluster;
a storage cluster;
one or more memories storing a set of instructions; and
one or more processors configured to execute the set of instructions to cause the system to perform:
receiving a request for data transfer from a source medium in the data storage system to a destination medium in the data storage system;
determining whether the source medium and the destination medium are within the storage cluster;
in response to a determination that the source medium and the destination medium are within the storage cluster, validating the data transfer with a cyclic redundancy check, wherein the data stored in the source medium includes error correcting code, and the error correcting code is encoded when the data is transferred from the computer cluster to the storage cluster.

14. The data storage system of claim 13, wherein the one or more processors are further configured to execute the set of instructions to cause the system to perform:
reading the data from the source medium;
generating a transferring cyclic redundancy check value according to the data;
generating a receiving cyclic redundancy check value according to the data transferred to the destination medium;
determining whether the transferring cyclic redundancy check value matches with the receiving cyclic redundancy check value; and
in response to a determination that the transferring cyclic redundancy check value does not match with the receiving cyclic redundancy check value, determining that the data transfer is invalid.

15. The data storage system of claim 14, wherein the one or more processors are further configured to execute the set of instructions to cause the system to perform:

in response to a determination that the data transfer is invalid, initiating a new data transfer for the data; and in response to a determination that the data transfer is not invalid, writing the data in the destination medium, wherein the data written in the destination medium includes error correcting code, and the error correcting code is generated when the data is transferred from the computer cluster to the storage cluster.

16. The data storage system of claim 13, wherein the one or more processors are further configured to execute the set of instructions to cause the system to perform:

in response to a determination that the source medium and the destination medium are not within the storage cluster, determining whether one of the source medium and the destination medium is within the computer cluster and another of the source medium and the destination medium is within the storage cluster; and in response to a determination that the one of the source medium and the destination medium is within the computer cluster and another of the source medium and the destination medium is within the storage cluster:

transferring the data from the source medium to the destination medium, and validating the data transfer with a cyclic redundancy check and error correcting code encoding.

17. The data storage system of claim 16, wherein the one or more processors are further configured to execute the set of instructions to cause the system to perform:

in response to the determination that the one of the source medium and the destination medium is within the computer cluster and another of the source medium and the destination medium is within the storage cluster:

determining whether the source medium is in the computer cluster; and in response to a determination that the source medium is in the computer cluster:

generating an error correcting code codeword by encoding the data with error correcting code, wherein the error correcting code codeword is transferred to the destination medium in the storage cluster.

18. The data storage system of claim 17, wherein the one or more processors are further configured to execute the set of instructions to cause the system to perform:

in response to a determination that the source medium is in the computer cluster:

generating a signature cyclic redundancy check value according to the data in the source medium, and inserting the signature cyclic redundancy check value into the data.

19. The data storage system of claim 16, wherein the one or more processors are further configured to execute the set of instructions to cause the system to perform:

determining whether the source medium is in the storage cluster; and in response to a determination that the source medium is in the storage cluster:

determining whether the data is invalid according to an error correcting code in the data, wherein the error correcting code is encoded when the data is transferred from the computer cluster to the storage cluster.

20. The data storage system of claim 19, wherein the one or more processors are further configured to execute the set of instructions to cause the system to perform:

in response to a determination that the source medium is in the storage cluster:

generating a cyclic redundancy check value according to the decoded data in the destination medium;

determining if the cyclic redundancy check value matches with a signature cyclic redundancy check value, wherein the signature cyclic redundancy check value is generated when the data is transferred from the computer cluster to the storage cluster;

in response to a determination that the cyclic redundancy check value does not match with the signature cyclic redundancy check value, determining that the data transfer is invalid.

* * * * *